US005972469A

United States Patent [19]

Curtis

[11] Patent Number: 5,972,469

[45] Date of Patent: Oct. 26, 1999

[54] BAFFLE FOR ELIMINATING INTERFERENCE RING(S) FROM THE OUTPUT LIGHT PATTERN OF A DEUTERIUM LAMP

[75] Inventor: James L. Curtis, Bath, N.Y.

[73] Assignee: Imaging & Sensing Technology Corporation, Horseheads, N.Y.

[21] Appl. No.: 09/016,476

[22] Filed: Jan. 30, 1998

[51] Int. Cl.$^6$ ................................ B32B 3/24; H01J 17/04

[52] U.S. Cl. ......................... 428/131; 428/134; 428/66.6; 428/913; 313/609; 313/610; 313/611; 313/590

[58] Field of Search .................................... 428/131, 134, 428/66.6, 913; 313/609, 610, 611, 590

[56] References Cited

U.S. PATENT DOCUMENTS

| | | | |
|---|---|---|---|
| 4,016,445 | 4/1977 | Cassidy et al. | 313/185 |
| 4,611,143 | 9/1986 | Shimazu et al. | 313/111 |
| 5,117,150 | 5/1992 | Schwarz et al. | 313/112 |
| 5,552,669 | 9/1996 | Ikedo et al. . | |
| 5,587,625 | 12/1996 | Ikedo et al. | 313/613 |
| 5,619,101 | 4/1997 | Ikedo et al. | 313/581 |
| 5,633,563 | 5/1997 | Ikedo et al. | 313/614 |
| 5,646,487 | 7/1997 | Ikedo et al. | 315/94 |
| 5,684,363 | 11/1997 | Ikedo et al. | 313/613 |
| 5,698,945 | 12/1997 | Ikedo et al. | 313/613 |
| 5,864,209 | 1/1999 | Clark | 313/622 |
| 5,886,470 | 3/1999 | Smolka | 313/637 |

OTHER PUBLICATIONS

Catalog "Deuterium Lamps and Power Supplies for UV Analytical Instruments", Imaging & Sensing Technology Corporation, Horseheads, NY 14845 (undated).

*Primary Examiner*—William P. Watkins, III
*Attorney, Agent, or Firm*—Phillips, Lytle, Hitchcock, Blaine & Huber LLP

[57] ABSTRACT

An improved baffle (24) for directing the light discharged from a deuterium lamp includes a plate-like member configured as a cylindrical segment (25), an aperture (27) provided through a central portion (26) of the member, and a flattened portion (26) about the aperture. The flattened portion is of such size and has a surface of such reflectivity as to substantially eliminate interference ring(s) of discontinuous light intensity from the light output of the lamp. A deuterium employing the improved baffle affords the advantage of markedly-increased light intensity, as compared with prior art baffles, at selected wavelengths.

7 Claims, 2 Drawing Sheets

BAFFLE FOR ELIMINATING INTERFERENCE RING(S) FROM THE OUTPUT LIGHT PATTERN OF A DEUTERIUM LAMP

TECHNICAL FIELD

The present invention relates generally to the field of deuterium lamps, and, more particularly, to improved baffles for use in such lamps to substantially eliminate at least one interference ring from the output light pattern of same.

BACKGROUND ART

Deuterium lamps produce broad-band ultraviolet radiation by maintaining a stable electric arc in a deuterium atmosphere. The spectral distribution of this radiation has a continuous range that extends from 160 to 400 nm. This continuous and stable characteristic of the arc makes deuterium lamps a useful source of ultraviolet light for analytical instruments, including spectrophotometers, liquid chromatography detectors, medical analyzers, pollution analyzers, calorimeters, densitometers, and the like.

Basically, deuterium lamps have a cathode and an anode arranged within an evacuated glass envelope that contains deuterium gas. A small restricting orifice is positioned in front of the anode to restrict the flow of current. When operated, a stream of thermoelectrons flows from the cathode toward the anode, thereby forming a "ball of fire" adjacent the anode. This "ball of fire" produces light in the ultraviolet range.

To this end, it has been known to provide a baffle adjacent the anode to shape and direct the light output from the lamp. Heretofore, this baffle was in the shape of a cylindrical segment, with a spherical recess positioned adjacent the aperture. Moreover, the surface of this baffle that faced the "ball of fire" was highly polished and highly reflective.

The particulars of such prior art lamps are shown and described in a catalog, "Deuterium Lamps and Power Supplies for UV Analytical Instruments", Imaging & Sensing Technology Corporation, Horseheads, New York 14845 (undated) and in U.S. Pat. No. 5,552,669. The aggregate disclosures of these two references are hereby incorporated by reference with respect to the background and operation of such deuterium lamps. In the '669 patent, the baffle of interest is indicated at 28, and is described as being a "opening limit plate" welded to focusing electrode 26. Upon information and belief, the shape and surface configuration of such prior art baffles contributed to the formation of certain undesirable interference rings in the output light pattern of such prior art lamps.

Accordingly, it would generally be desirable to eliminate such interference ring(s) from the output light pattern of a deuterium lamp, and to have the light intensity vary as a substantially-continuous inverse function of the distance from the centerline of the aperture.

DISCLOSURE OF THE INVENTION

With parenthetical reference to the corresponding parts, portions or surfaces of the disclosed embodiment, merely for purposes of illustration and not by way of limitation, the present invention broadly provides an improved baffle for directing the light discharged from a deuterium lamp.

The improved baffle (24) broadly includes a plate-like member configured as an arcuate segment (25); and an aperture (27, 27') provided through a central portion of the plate-like member. A portion (26) about and adjacent the aperture is flattened. This flattened portion being of such size and having a surface of such reflectivity as to substantially eliminate an interference ring attributable to a different or discontinuous light intensity from the output light pattern of the lamp.

In the preferred embodiment, the arcuate segment is configured as a cylindrical segment. The flattened portion may have a circular appearance, when viewed in plan. The surface of the baffle that faces the ball of fire has a low reflectivity, as by having been bead blasted, chemically etched, darkened, etc. The improved baffle causes the intensity of light to be discharged as a generally-continuous inverse function of the transverse distance from the aperture. The aperture may be circular, rectangular, or may have some other shape.

Accordingly, the general object of the invention is to provide an improved baffle for use in a deuterium lamp.

Another object is to provide an improved baffle for use in a deuterium lamp, which baffle substantially eliminates the interference ring(s) from the output light pattern of the lamp.

Still another object is to provide an improved light-directing baffle for a deuterium lamp, in which the intensity of light emitted from the lamp varies inversely in a substantially-continuous manner with the transverse distance from the aperture.

These and other objects and advantages will become apparent from the foregoing and ongoing written specification, the drawings, and the appended claims.

DESCRIPTION OF THE PREFERRED EMBODIMENTS

Figure 2:
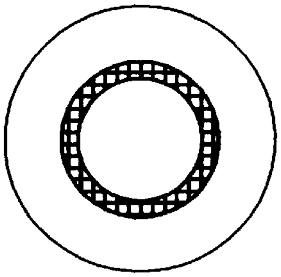
FIG. 2 is a schematic view showing the interference rings in the output light pattern of the lamp, when seen in elevation.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms “horizontal”, “vertical”, “left”, “right”, “up” and “down”, as well as adjectival and adverbial derivatives thereof (e.g., “horizontally”, “rightwardly”, “upwardly”, etc.) simply refer to the orientation of the illustrated structure as the particular drawing figure faces the reader. Similarly, the terms “inwardly” and “outwardly” generally refer to the orientation of a surface relative to its axis of elongation, or axis of rotation, as appropriate.

Referring now to the drawings, the present invention relates generally to deuterium lamps, and, more particularly, to an improved light-directing baffle for use in such lamps.

Figure 1:
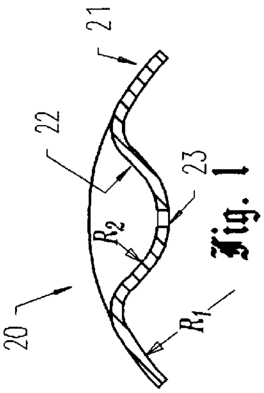
FIG. 1 is a transverse vertical sectional view of a prior art deuterium lamp baffle having a concave recess formed about the aperture.

In the accompanying drawings, FIG. 1 is a transverse vertical sectional view of a prior art baffle, generally indicated at 20, used in prior art deuterium lamps. This baffle had an rectangular outline or shape when seen in top plan (not shown), and was bent about a mandrel to form a cylindrical segment 21 of radius $R_1$. A forming tool (not shown) was used to form a spherical depression or recess 22 of radius $R_2$ in a central portion of the baffle. A circular hole or aperture 23 was provided through the central portion of the baffle.

Figure 3:
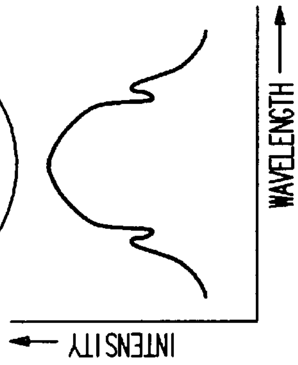
FIG. 3 is a schematic plot of intensity (I) vs. transverse distance (x) from the aperture centerline, this view depicting the interference ring shown in FIG. 2 as occurring as a function of light intensity.
Figure 4:
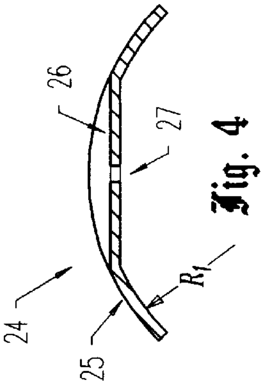
FIG. 4 is a transverse vertical sectional view of an improved baffle, this view showing such baffle as having a flattened portion immediately about the aperture.

When used in a deuterium arc lamp, a “ball of fire” (not shown) would be formed immediately adjacent the recess, in a manner analogous to “arc ball” 292 in FIG. 4 of the ’669 patent. However, because this “arc ball” or “ball of fire” was not a point source of light, and because the concave surface of baffle depression 22 was not parabolic, the prior art lamp had an output light pattern that included one or more concentric interference rings, as schematically shown in FIG. 2. FIG. 3 is a schematic plot of light intensity (I) vs. transverse spacing (x) from the centerline of the aperture, and schematically shows the interference rings as occurring at regions of reduced light intensity at various distances from the center of the baffle.

Figure 5:
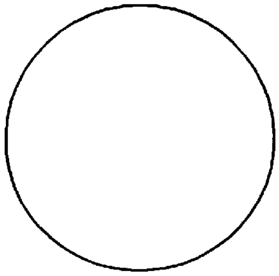
FIG. 5 is a schematic view showing the output light pattern of lamp incorporating the improved baffle, when seen in elevation.
Figure 6:
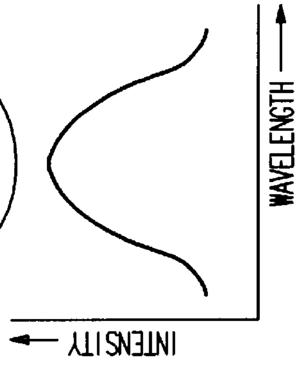
FIG. 6 is a schematic plot of intensity (I) vs. transverse distance (x) for a lamp having the improved baffle shown in FIG. 4.

FIG. 4 is a transverse vertical sectional view of an improved baffle, generally indicated at 24. This improved baffle is shown as also having a rectangular outline or appearance when seen in plan (FIGS. 7–8), and as again having an arcuate shape in the form of a cylindrical segment 25 of radius $R_1$. However, unlike the prior art baffles shown in FIG. 1, the improved baffle has a flattened portion 26 formed immediately about aperture 27. This flattened portion may be formed by elastically deforming the baffle after it has been initially formed to its arcuate cylindrically-segmented shape. FIG. 5 is a sketch schematically depicting the light intensity, when seen in elevation, of the lamp employing the improved baffle, with the stippling density indicating that the output light intensity various continuously and inversely with radial distance form the aperture centerline. FIG. 6 is a plot of intensity (I) vs. transverse distance (x) from the aperture centerline, showing that the improved baffle provides a light intensity that varies inversely in a smooth and continuous relationship with transverse spacing from the aperture centerline.

Figure 7:
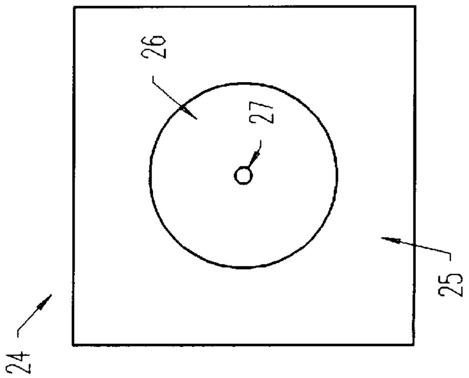
FIG. 7 is a top plan view of the improved baffle shown in FIG. 4, this view showing the aperture as being circular.

FIG. 7 is a top plan view of the baffle shown in FIG. 4, this view showing the baffles provided with a circular aperture.

Figure 8:
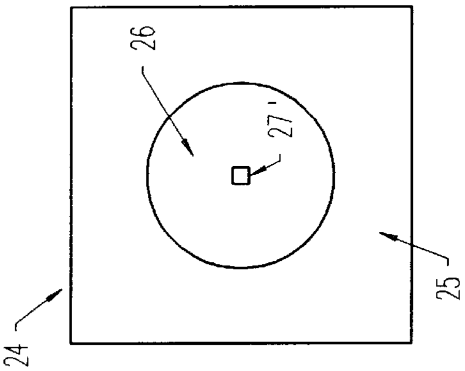
FIG. 8 is a top plan view of another improved baffle, this view showing the aperture as being rectangular.

FIG. 8 is a top plan view of a second form of the improved baffle, this view showing the baffle as having a rectangular aperture.

Figure 9:
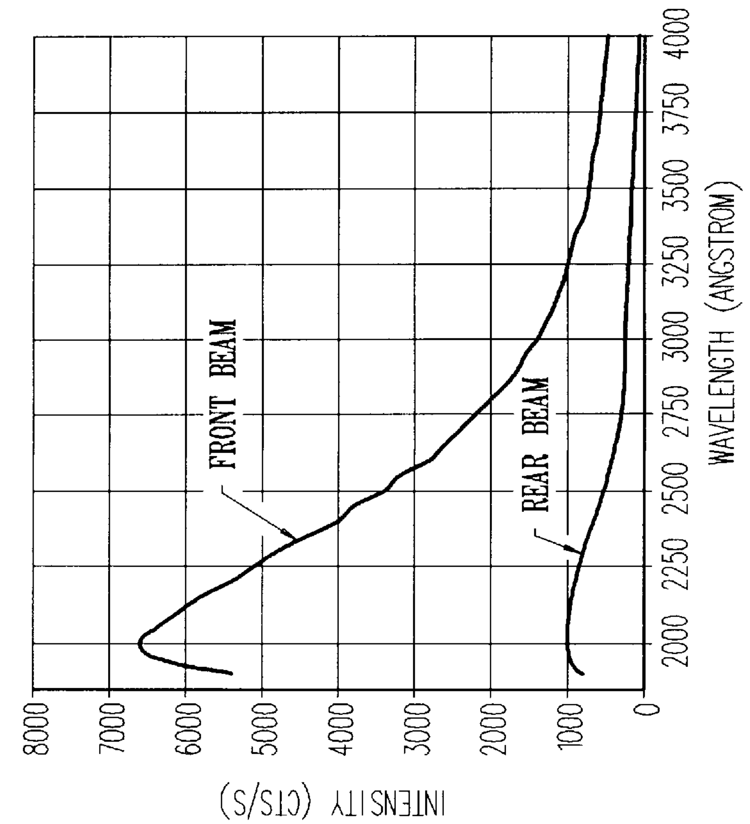
FIG. 9 is a plot of intensity (I) vs. wavelength ($\lambda$) of a deuterium lamp having a prior art baffle therein.

FIG. 9 is a plot of light intensity (I) vs. wavelength (λ), and illustrates the front and rear light outputs of a prior art deuterium lamp employing the conventional prior art baffle shown in FIG. 1 and the improved baffle shown in FIG. 4. In this regard, it should be noted that the ratio of the front beam intensity to the rear beam intensity, varied greatly (i.e., from a value of about 6.5 at 2000 Angstroms to a value of about 3.5 at 3500 Angstroms), as a function of wavelength.

Figure 10:
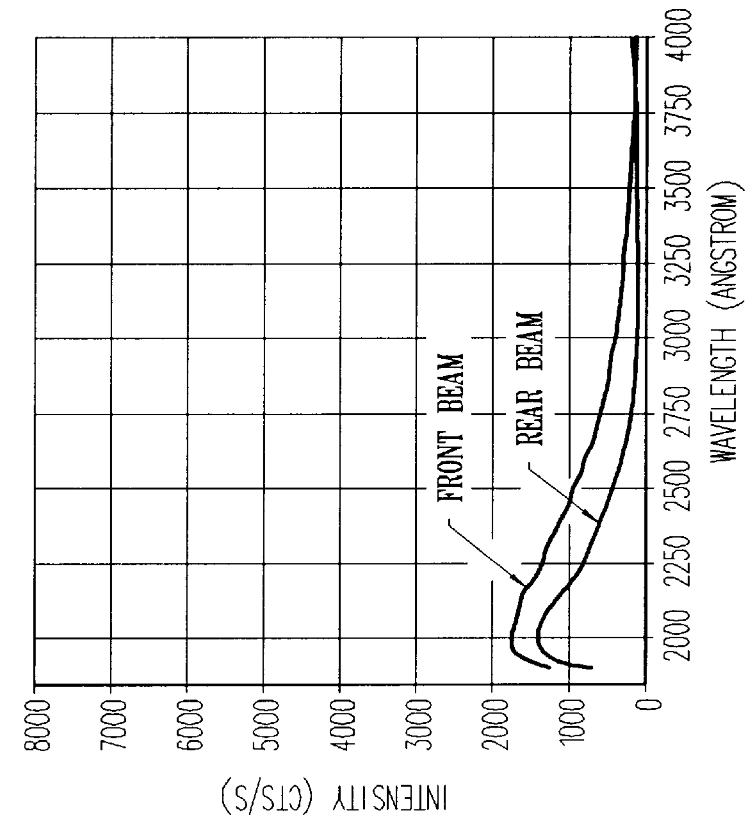
FIG. 10 is a plot of intensity (I) vs. wavelength ($\lambda$) of the deuterium lamp whose performance is plotted in FIG. 9, except that it incorporates the improved baffle according to the present invention.

FIG. 10 is a plot of light intensity (I) vs. wavelength (λ) of the prior art lamp whose performance is depicted in FIG. 9, except that it incorporates an improved baffle according to the present invention. It should be noted that the ratio of the front beam intensity to the rear beam intensity is much closer to one at 2000 Angstroms and at 3500 Angstroms).

Therefore, the present invention provides an improved baffle for use in a deuterium lamp, which substantially eliminates interference ring(s) in the output light pattern, and which affords the capability of increased light intensity in the output.

Modifications

The present invention contemplates that many changes and modifications may be made. For example, while the improved baffle is shown as being a cylindrical segment, it may be configured as other arcuate segments as well. The baffle may have a rectangular or some other cross appearance or outline. The flattened portion may be circular, elliptical, or have some other shape or appearance, when seen in elevation. Similarly, the aperture may be circular, rectangular, or have some other shape as well. Preferably, the baffle is formed of molybdenum, although this is not deemed critical.

Therefore, while the improved baffle has been shown and described, and several modifications thereof discussed, the person skilled in this art will readily appreciate that various additional changes and modifications may be made without departing from the spirit of the invention, as defined and differentiated by the following claims.

What is claimed is:

1. A baffle for directing the light discharged from a deuterium lamp, comprising:

a plate-like member configured as an arcuate segment; and an aperture provided through a central portion of said member;

a portion of said member about said aperture being flattened, such flattened portion being of such size and having a surface of such reflectivity as to substantially eliminate interference rings of different light intensity from the light output pattern of said lamp.

2. A baffle as set forth in claim 1 wherein said arcuate segment is a segment of a cylinder.

3. A baffle as set forth in claim 1 wherein said flattened portion has a circular appearance when viewed in plan.

4. A baffle as set forth in claim 1 wherein said lamp has a ball of fire when operating, and wherein the surface of said baffle that faces said ball of fire has a low reflectivity.

5. A baffle as set forth in claim 1 wherein the intensity of light discharged from said lamp is inversely related to the transverse distance from the centerline of said aperture.

6. A baffle as set forth in claim 1 wherein said aperture is circular.

7. A baffle as set forth in claim 1 wherein said aperture is rectangular.

* * * * *

UNITED STATES PATENT AND TRADEMARK OFFICE
CERTIFICATE OF CORRECTION

PATENT NO. : 5,972,469
DATED : October 26, 1999
INVENTOR(S) : Curtis L. James

It is certified that error appears in the above-identified patent and that said Letters Patent is hereby corrected as shown below:

On the title page:

column 1, item [75]: The inventor's name should be -- Curtis L. James --, not "James L. Curtis."

Item [19] "Curtis" should read-- James --.

Signed and Sealed this

Sixteenth Day of May, 2000

Attest:

Q. TODD DICKINSON

Attesting Officer

*Director of Patents and Trademarks*